Aug. 5, 1924.
E. BUGATTI
1,504,092
TURNING TOOL FOR TURRET AND AUTOMATIC LATHES AND THE LIKE
Filed Aug. 25, 1921   3 Sheets-Sheet 1
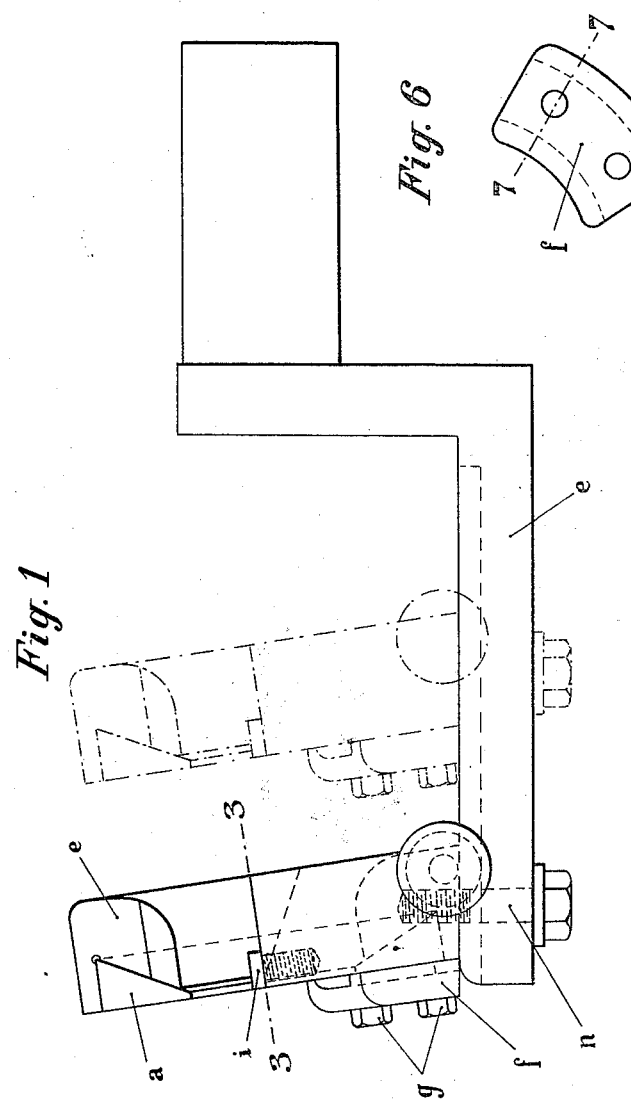

Aug. 5, 1924.  
E. BUGATTI  
1,504,092  
TURNING TOOL FOR TURRET AND AUTOMATIC LATHES AND THE LIKE  
Filed Aug. 25, 1921   3 Sheets-Sheet 2
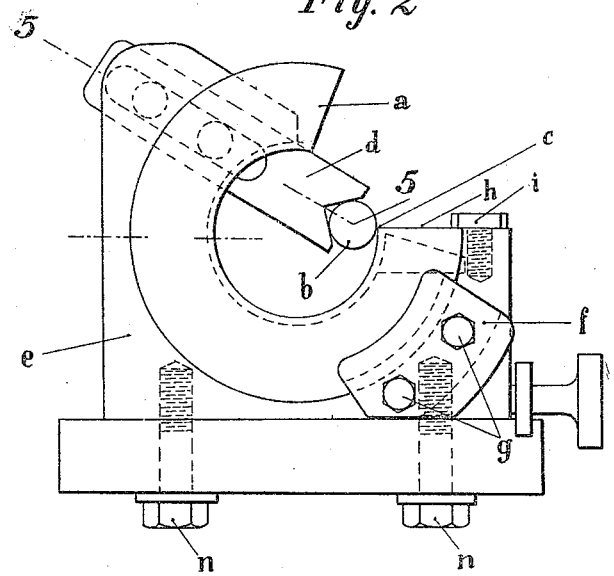
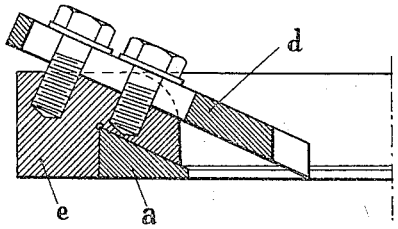
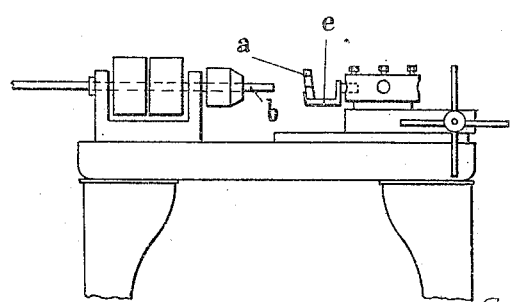
Inventor  
Ettore Bugatti Aug. 5, 1924.  1,504,092
E. BUGATTI
TURNING TOOL FOR TURRET AND AUTOMATIC LATHES AND THE LIKE
Filed Aug. 25, 1921.    3 Sheets-Sheet 3
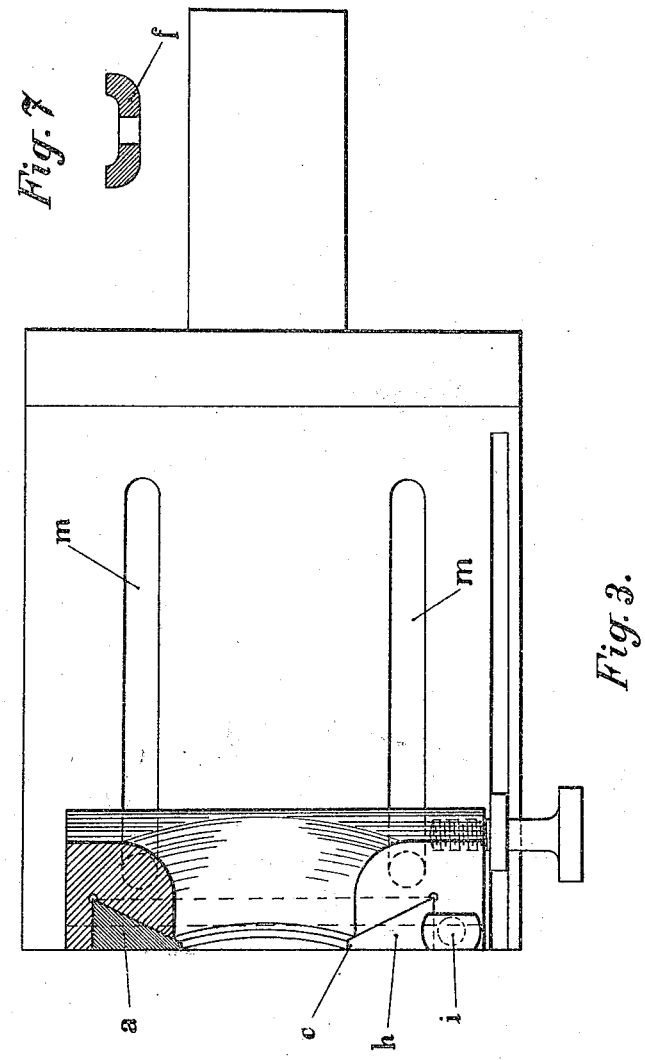
Inventor
Ettore Bugatti Patented Aug. 5, 1924.

1,504,092

UNITED STATES PATENT OFFICE.

ETTORE BUGATTI, OF MOLSHEIM, FRANCE.

TURNING TOOL FOR TURRET AND AUTOMATIC LATHES AND THE LIKE.

Application filed August 25, 1921. Serial No. 495,298.

(GRANTED UNDER THE PROVISIONS OF THE ACT OF MARCH 3, 1921, 41 STAT. L., 1313.)

*To all whom it may concern:*

Be it known that I, ETTORE BUGATTI, a subject of the King of Italy, residing at Molsheim, Bas-Rhin, France, have invented certain new and useful Improvements in Turning Tools for Turret and Automatic Lathes and the like, and for which I have filed applications in France, 505,004, Oct. 17, 1919, and Great Britain, 152,903, Jan. 2, 1920; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention consists in making a cutting tool in the shape of a ring whose interior face performs the cutting on the piece to be turned and also consists in providing a work holder, and a tool support particularly adapted for a tool of this character.

Owing to the substitution of a ring for a disc, as heretofore employed, the piece of work to be turned can be positioned within the ring, the cut being made by the internal edge of the ring, or even by one of its lateral faces.

The improved tool possesses the following advantages: The angle of cut between the work and tool can be made whatever may be desired; the work does not vibrate, the point of the tool is no longer apt to break because it is rather compressed than bent, the assemblage comprising the tool, the work, and the work holder does not take up much space because the tool is nearly concentric with the piece of work.

Moreover, the tool, in the form of a ring is capable of having a constant inner profile and is particularly applicable to turret and automatic lathes, and renders the work done by such machines very economical, because the tool can be sharpened and be replaced in the machine without it being necessary to adjust the machine afresh.

The improved apparatus embodies all the advantages of the disc with constant profile and is adaptable to turret of turret and automatic lathes, replacing advantageously in such machines the straight tools which are costly by reason of the long time required to re-set them after sharpening.

The following description and accompanying drawing, given by way of example, explain how the invention can be carried out.

Fig. 1 is a side view of a tool carrier constructed according to the invention, and adapted for the turret of a turret lathe;

Fig. 2 is an end view of the carrier on which is shewn a bar to be machined held in place by the stay.

Fig. 3 is a section on line 3—3 in Fig. 1;

Fig. 4 is a diagrammatic view of a turret lathe, whose turret holds the tool carrier, shewn in Figs. 1, 2 & 3.

Fig. 5 is a section on the line 5—5 in Fig. 2; of the stay and the tool holder;

Fig. 6 is a view of a detail of the tool clamping member;

Fig. 7 is a section on line 7—7 of Fig. 6.

It will be seen that the work to be machined, for example, the bar $b$ is attacked by the edge $c$ of the tool which is in the shape of a ring $a$ having a gap therein and possesses the above enumerated advantages. A tool-holder $e$ supports the tool so that the sides of the latter lie in a plane inclined to the longitudinal axis of the bar or piece $b$ as shown in Fig. 4.

The clamping of the tool $a$ to its support $e$ is effected by means of a plate $f$ and two bolts $g$. Such a mounting permits of the sharpening of the cutting portion and the replacement of the tool $a$ in the exact cutting position, the face $h$ of the tool being made to abut against the stop pin or stud $i$ (Figs. 2 & 3) whereupon the tool $a$ is fixed by the clamping plate $f$.

The bar or piece $b$ to be machined is held in place by means of a holder $d$ adjustably mounted on the tool support $e$. The side of the latter to which the holder $d$ is clamped is inclined to that the free bar-supporting end of said holder lies within the inner periphery of the ring-tool $a$ close to the cutting edge $c$.

The tool holder has two grooves $m$, which after the bolts $n$ (Figs. 3 & 1) are slacked, allow of the tool being displaced as indicated in broken line in Fig. 1.

It will be seen that the cutting can be effected either by one of the lateral edges of the ring or by the internal edge of the ring or by both. The profile of the cutting part may evidently be of any desired form.

This tool can be used for any kind of cutting work, whatever may be its size and the size of the piece of work.

Having thus described the nature of my said invention and the best means I know of carrying the same into practical effect, I claim:—

1. A cutting tool consisting of a ring whose interior diameter is considerably larger than the diameter of the work and having a gap therein and bounded by two planes, one of which forms at the interior of the tool a longitudinal cutting edge parallel to the axis and a transverse cutting edge perpendicular to the longitudinal cutting edge, said ring also being narrower at its inner periphery than at its outer periphery.

2. The combination of a cutting tool consisting of a ring having a gap therein and bounded by two planes, one of which forms at the interior of the tool a longitudinal cutting edge parallel to the axis and a transverse cutting edge perpendicular to the longitudinal cutting edge, and means for securing and adjusting the tool comprising a holder, a laterally arranged plate for clamping the tool to the holder, and a bolt screwed into the holder having a head adapted to bear against the operative radial surface of the tool.

3. The combination of a cutting tool consisting of a ring having a gap therein and bounded by two planes, one of which forms at the interior of the tool a longitudinal cutting edge parallel to the axis and a transverse cutting edge perpendicular to the longitudinal cutting edge, a tool support, means for clamping the tool onto the support, and a work-holder having one end adjustably secured to the support and its free end projecting within the inner periphery of the tool adjacent the cutting edges of the latter.

In testimony that I claim the foregoing as my invention, I have signed my name.

ETTORE BUGATTI.